US009912389B2

(12) United States Patent
Moosavi et al.

(10) Patent No.: US 9,912,389 B2
(45) Date of Patent: Mar. 6, 2018

(54) METHODS AND APPARATUS TO ACCOUNT FOR EFFECTIVE DOWNLINK-CHANNELS ARISING FROM BEAMFORMING UPLINK REFERENCE SIGNALS

(71) Applicant: Telefonaktiebolaget L M Ericsson (publ), Stockholm (SE)

(72) Inventors: Reza Moosavi, Linköping (SE); Gabor Fodor, Hässelby (SE); Martin Hessler, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 89 days.

(21) Appl. No.: 14/890,550

(22) PCT Filed: Oct. 5, 2015

(86) PCT No.: PCT/SE2015/051047
§ 371 (c)(1),
(2) Date: Nov. 11, 2015

(87) PCT Pub. No.: WO2017/061909
PCT Pub. Date: Apr. 13, 2017

(65) Prior Publication Data
US 2017/0187430 A1 Jun. 29, 2017

(51) Int. Cl.
*H04B 1/00* (2006.01)
*H04B 7/04* (2017.01)
(Continued)

(52) U.S. Cl.
CPC .......... *H04B 7/043* (2013.01); *H04B 7/0417* (2013.01); *H04B 7/0478* (2013.01);
(Continued)

(58) Field of Classification Search
CPC .. H04B 7/0408; H04B 7/0452; H04B 7/0456; H04B 7/0617; H04B 7/086; H04W 88/02; H04W 88/08
(Continued)

(56) References Cited

U.S. PATENT DOCUMENTS 8,750,205 B2 * 6/2014 Chen ...................... H04B 7/024
370/328
8,971,203 B2 3/2015 Park
(Continued)

*Primary Examiner* — Tan H Trinh
(74) *Attorney, Agent, or Firm* — Murphy, Bilak & Homiller, PLLC

(57) ABSTRACT

According to the teachings herein, a wireless device enhances uplink channel estimation at a node in a supporting wireless communication network by beamforming its uplink reference signal transmission towards the node, and correspondingly compensates for the effect of that beamforming when receiving a downlink transmission that was adapted in dependence on the uplink channel transmission. Such processing provides significant advantages in Multiple-Input-Multiple-Output, MIMO, systems that use a potentially large number of antennas for downlink MIMO transmissions and assume reciprocity between the uplink and downlink channels. In particular, uplink beamforming increases the received signal quality of the uplink reference signal used for estimating the uplink channel, while "automatic" compensation by the wireless device of the corresponding downlink transmission obviates the need for the network to know which precoder was used for uplink beamforming, or even that uplink beamforming is in use.

18 Claims, 5 Drawing Sheets

(51) Int. Cl.
*H04B 7/06* (2006.01)
*H04L 25/03* (2006.01)
*H04B 7/08* (2006.01)
*H04B 7/0417* (2017.01)
*H04W 88/08* (2009.01)
*H04B 7/0413* (2017.01)

(52) U.S. Cl.
CPC ......... *H04B 7/0617* (2013.01); *H04B 7/0634* (2013.01); *H04B 7/0665* (2013.01); *H04B 7/0842* (2013.01); *H04L 25/03* (2013.01); *H04W 88/08* (2013.01); *H04B 7/04* (2013.01); *H04B 7/0413* (2013.01); *H04L 2025/03426* (2013.01)

(58) Field of Classification Search
USPC ...... 455/272, 63.4, 522, 452.1, 67.11, 67.13, 455/67.16, 575.7, 115.1, 135; 375/224, 375/267, 219, 262, 347; 370/329, 311, 370/252, 281, 452.1
See application file for complete search history.

(56) References Cited

U.S. PATENT DOCUMENTS

| | | | | |
|---|---|---|---|---|
| 9,179,332 | B2* | 11/2015 | Hammarwall | H04B 7/0626 |
| 9,521,622 | B2* | 12/2016 | Yang | H04W 52/0238 |
| 2008/0075188 | A1* | 3/2008 | Kowalski | H04L 27/2602 375/267 |
| 2008/0080632 | A1* | 4/2008 | Kim | H04L 1/0687 375/267 |
| 2008/0159250 | A1* | 7/2008 | Kowalski | H04L 5/0048 370/344 |
| 2008/0219343 | A1* | 9/2008 | Wu | H04L 25/0228 375/232 |
| 2009/0080546 | A1* | 3/2009 | Zhao | H04B 7/0626 375/260 |
| 2013/0045690 | A1* | 2/2013 | Seol | H04B 7/0417 455/63.4 |
| 2013/0182627 | A1* | 7/2013 | Lee | H04W 72/042 370/311 |
| 2013/0223301 | A1* | 8/2013 | Lee | H04W 72/042 370/281 |
| 2013/0242773 | A1* | 9/2013 | Wernersson | H04B 7/024 370/252 |
| 2013/0286993 | A1* | 10/2013 | Lee | H04L 5/001 370/329 |
| 2013/0303090 | A1* | 11/2013 | Hammarwall | H04B 7/0456 455/67.13 |
| 2013/0329772 | A1* | 12/2013 | Wernersson | H01Q 3/00 375/219 |
| 2014/0011468 | A1* | 1/2014 | Park | H04B 7/0802 455/272 |
| 2014/0146863 | A1* | 5/2014 | Seol | H04B 7/0456 375/224 |
| 2014/0185481 | A1* | 7/2014 | Seol | H04W 52/42 370/252 |
| 2015/0171949 | A1* | 6/2015 | Choi | H04B 7/0639 375/267 |
| 2016/0006122 | A1* | 1/2016 | Seol | H04B 7/0408 342/372 |
| 2016/0065388 | A1* | 3/2016 | Kakishima | H04B 17/391 370/329 |
| 2016/0112311 | A1* | 4/2016 | Vyas | H04W 40/02 370/328 |
| 2016/0337056 | A1* | 11/2016 | Frenne | H04B 7/0695 |
| 2016/0344526 | A1* | 11/2016 | Fan | H04L 5/0048 |
| 2016/0345206 | A1* | 11/2016 | Yerramalli | H04W 28/12 |

* cited by examiner

METHODS AND APPARATUS TO ACCOUNT FOR EFFECTIVE DOWNLINK-CHANNELS ARISING FROM BEAMFORMING UPLINK REFERENCE SIGNALS

TECHNICAL FIELD

The present invention relates to wireless communication networks, and particularly relates to accounting for the effect of beamforming uplink reference signals.

BACKGROUND

Ongoing technology and standardization developments make the use of large antenna arrays at cellular base stations and other wireless access points a viable option to boost the air interface capacities and maximum data rates of wireless communication networks. Consider a base station or an access point equipped with a large number of antennas. The node can simultaneously schedule multiple wireless devices in the same time/frequency band, using simple linear processing such as maximum-ratio transmission or zero-forcing in the downlink and maximum-ratio combining or zero-forcing in the uplink. Current literature often refers to these multi-antenna arrangements as very large multiple-input-multiple-output, VL-MIMO, or as "massive" MIMO. VL-MIMO systems are also sometimes referred to as "full dimension" or FD systems. FD-MIMO provides throughput gains without consuming additional spectrum and further offers substantial improvements in radiated energy efficiency. Reflecting the burgeoning interest in FD-MIMO technology, the Third Generation Partnership Project, 3GPP, has an active work item focused on the use of FD-MIMO.

Narrow beam forming in the downlink represents a key aspect of FD-MIMO. Base stations use narrow beam forming to focus transmitted energy towards desired users—i.e., towards the wireless devices being served at any given time. Focusing the radiated energy boosts coverage and raises the maximum data rates achievable on the downlink under real-world channel conditions.

Accurate channel state information, CSI, is a requisite for effective beamforming and acquiring accurate CSI in a scalable fashion for FD-MIMO systems is non-trivial. In conventional systems, radio network nodes transmit per-antenna pilot signals, and wireless devices estimate downlink channel gain based on measurements of the pilot signals. These per-antenna approaches are not feasible for a base station that uses a large number of downlink transmit antennas.

Where reciprocity exists between the uplink and downlink channels, such as in Time Division Duplex, TDD, operation, a wireless device transmits a Sounding Reference Signal, SRS, or other type of reference signal on the uplink. The receiving network base station uses the received reference signal to estimate both the uplink and downlink channels between it and the wireless device. For the channel estimation to be of sufficiently high quality, the base station must receive the uplink reference signal(s) with a sufficiently high Signal-to-Noise Ratio or SNR. This requirement poses challenges for the typical wireless device, which generally is battery operated or otherwise power-limited. Because the uplink should be sounded over the entire frequency band of interest, potentially significant energy radiation by the wireless device is required to achieve sufficient signal quality at the base station. Operation by a wireless device within a cell edge region exacerbates the problem of providing the network base station with reference signals of sufficiently high reception quality.

Beamforming represents one trick available to multi-antenna wireless devices for ensuring that the network base station receives its uplink reference signals at a sufficient received-signal strength. With uplink beamforming, more of the radiated signal energy is steered towards the network base station, thereby improved received signal quality at the network base station for the uplink reference signal.

However, this disclosure recognizes that several disadvantages or problems attend the use of beamforming for uplink reference signal transmission. For example, the network base station uses the received reference signal to estimate the downlink channel to the wireless device, e.g., for link adaptation of its downlink transmissions to the wireless device. Taking the exact same propagation channel conditions, the uplink channel as perceived by the network base station will look different in depending on whether or not the wireless device uses beamforming for its uplink reference signal transmission. Further, beamforming characteristics depend on antenna weights used by the wireless device for beamforming. Consequently, the perceived or "effective" channel seen by the network base station depends on the particular precoder—antenna weight matrix—used by the wireless device.

Providing information to the network base station regarding uplink beamforming solves these problems. However, that approach requires additional uplink signaling from the wireless device and, therefore, represents an added signaling burden.

SUMMARY

According to the teachings herein, a wireless device enhances uplink channel estimation at a node in a supporting wireless communication network by beamforming its uplink reference signal transmission towards the node, and correspondingly compensates for the effect of that beamforming when receiving a downlink transmission that was adapted in dependence on the uplink channel transmission. Such processing provides significant advantages in Multiple-Input-Multiple-Output, MIMO, systems that use a potentially large number of antennas for downlink MIMO transmissions and assume reciprocity between the uplink and downlink channels. In particular, uplink beamforming increases the received signal quality of the uplink reference signal used for estimating the uplink channel, while "automatic" compensation by the wireless device of the corresponding downlink transmission obviates the need for the network to know which precoder was used for uplink beamforming, or even that uplink beamforming is in use.

One embodiment comprises a method at a wireless device configured for operation in a wireless communication network. The example method includes transmitting a reference signal to the wireless communication network using uplink beamforming. The method includes correspondingly receiving a downlink transmission from the wireless communication network that was beamformed in dependence on an effective channel arising from the use of uplink beamforming on the reference signal. Still further, the method includes accounting for the effective channel by applying a linear transform to the received downlink transmission to obtain a compensated received transmission, wherein the linear transform is based on a precoder matrix used for the uplink beamforming.

Another embodiment comprises a wireless device configured for operation in a wireless communication network. The example device includes a communication interface configured to transmit signals to the wireless communication network and to receive signals from the wireless communication network. Further, the device includes processing circuitry that is operatively associated with the communication interface and configured to receive a beamformed downlink transmission from the wireless communication network. Here, the network beamformed the downlink transmission in dependence on an effective channel arising from the use of uplink beamforming on a reference signal transmitted by the device. The processing circuitry is configured to account for the effective channel by applying a linear transform to the received downlink transmission, to obtain a compensated received transmission. The linear transform is based on a precoder matrix used for the uplink beamforming.

Another embodiment comprises a non-transitory computer-readable medium storing a computer program comprising program instructions. When executed by a processor of a wireless device that receives a downlink transmission that is beamformed by a network node in a wireless communication network according to a channel estimate determined from a reference signal transmitted by the device, the program instructions configure the device to obtain a compensated received transmission. The compensated received transmission is obtained by the device linearly transforming the received downlink transmission according to a precoder matrix used by the device for beamforming the reference signal.

In yet another embodiment, a wireless device includes a communication module configured to receive a downlink transmission that is beamformed by a network node in a wireless communication network according to a channel estimate determined from a reference signal transmitted by the device. The device further includes a compensation module that is configured to obtain a compensated received transmission by linearly transforming the received downlink transmission according to a precoder matrix used by the wireless device for beamforming the reference signal.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
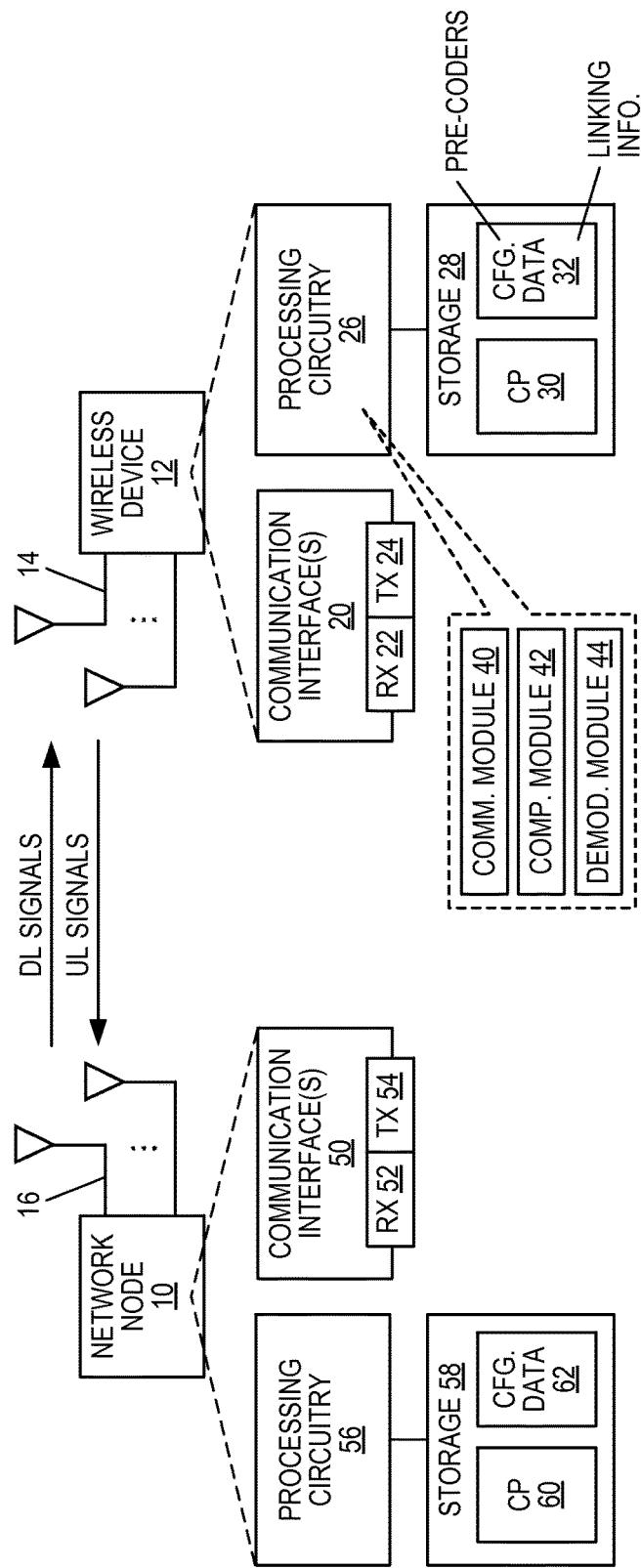
FIG. 1 is a block diagram of one embodiment of a network node and a wireless device.

FIG. 1 illustrates an example network node 10 and an example wireless device 12. While not shown in FIG. 1, it shall be understood that the network node 10 forms part of a wireless communication network—the "network"—and the wireless device 12 is configured for operation in the network. The network comprises, for example, a Third Generation Partnership Project, 3GPP, cellular communication network such as a Long Term Evolution, LTE, network. Correspondingly, the network node 10 may be a cellular radio base station, such as an LTE eNB, and the wireless device 12 comprises a User Equipment or UE in 3GPP parlance. No limitations should be inferred by this example, however, and the wireless device 12 may comprise essentially any type of wireless communication apparatus, including a mobile communication device, a computer or other device with wireless networking capabilities, a Machine-Type Communication, MTC, device, etc.

The wireless device 12 includes two or more antennas 14 for transmitting and/or receiving signals, and the network node 10 also may include multiple antennas or antenna elements 16. Uplink beam forming used at least selectively by the wireless device 12 enables the wireless device 12 to improve received signal strength at the network node 10, with respect to uplink transmissions by the wireless device 12. Because these beamformed transmissions on the uplink include reference signals used for downlink channel adaptation by the network node 10, the effective channel on the downlink between the network node 10 and the wireless device 12 thus reflects the effects of the uplink beamforming. Advantageously, the wireless device 12 compensates for those effects in its received signal processing.

To better appreciate an example implementation of such compensation, the wireless device 12 includes a communication interface 20 that includes one or more radiofrequency receivers 22 and transmitters 24 and associated protocol processing circuitry that are adapted to support the uplink and downlink air interfaces implemented within the wireless communication network—not shown—in which the network node 10 operates. Processing circuitry 26 is operatively associated with the communication interface 20 and comprises fixed circuitry, programmed circuitry, or a combination of fixed and programmed circuitry.

In an example embodiment, the processing circuitry 26 is at least partly implemented using programmed circuitry and comprises, for example, one or more processor circuits, such as one or more microprocessors, Digital Signal Processors or DSPs, Application Specific Integrated Circuits or ASICs, Field Programmable Gate Arrays or FPGAs, or other digital processing circuitry. Correspondingly, the processing circuitry 26 includes or is associated with one or more types of computer-readable media—"STORAGE 28" in the figure—such as one or more types of memory circuits such as FLASH, EEPROM, SRAM, DRAM, etc. Additionally, or alternatively, the storage 28 comprises hard disk storage, Solid State Disk, SSD, storage, etc.

In general, the storage 28 provides both working memory and longer-term storage. In at least one embodiment, the storage 28 provides non-transitory storage for a computer program 30 and one or more items of configuration data 32. Here, non-transitory does not necessarily mean permanent or unchanging storage but does means storage of at least some persistence—i.e., holding information for subsequent retrieval. The computer program 30, which may comprise a number of related or supporting programs, comprises program instructions that, when executed by the processing circuitry 26, configure the wireless device 12 to operate according to the examples described herein.

In other words, in some embodiments, one or more processing circuits within the wireless device 12 are specially adapted to carry out the teachings herein, based on their execution of the computer program instructions comprising the computer program 30. Such execution configures the processing circuitry 26 to include, for example, a communication module 40 configured to receive a downlink signal that is beamformed by a network node 10 in a wireless communication network according to a channel estimate determined from a reference signal transmitted by the wireless device 12 and a compensation module 42 configured to obtain a compensated received signal by linearly transforming the received downlink signal according to a precoder matrix used by the wireless device 12 for beamforming the reference signal. In at least one such embodiment, the processing circuitry 26 implements a demodulation module 44 that is configured to demodulate the compensated received signal, for information recovery at the wireless device 12.

More broadly, the wireless device 12 in one or more embodiments is configured for operation in a wireless communication network—not shown—and the aforementioned communication interface 20 is configured to transmit signals to the wireless communication network and to receive signals from the wireless communication network. Correspondingly, the processing circuitry 26 is operatively associated with the communication interface 20 and configured to receive a beamformed downlink transmission from the network that was beamformed in dependence on an effective channel arising from the use of uplink beamforming on a reference signal transmitted by the wireless device 12, and account for the effective channel by applying a linear transform to the received downlink transmission, to obtain a compensated received transmission, wherein the linear transform is based on a precoder matrix used for the uplink beamforming.

The processing circuitry 26 uses the compensated received transmission for information recovery, for example, based on being configured to demodulate the compensated received downlink transmission, for recovering information conveyed in the received downlink transmission. Here, rather than performing demodulation processing on the received downlink transmission—held as signal samples in buffer memory in the processing circuitry 26—the processing circuitry 26 performs demodulation processing on compensated signal samples resulting from application of the linear transform to the signal samples comprising the received downlink transmission.

In some embodiments, the processing circuitry 26 is configured to linearly transform the received downlink transmission, i.e., the received downlink signal in question, by applying a transpose of the precoder matrix to the received downlink transmission. Note, however, that in at least some embodiments, the wireless device 12 does not necessarily apply uplink beamforming when transmitting reference signals. In cases where the received downlink transmission corresponds to an uplink reference signal that was transmitted by the wireless device 12 without the use of beamforming, the wireless device 12 skips the compensation processing—i.e., skips the linear transformation of the received downlink transmission—and applies its demodulation processing to the received downlink transmission.

In at least one such embodiment, the processing circuitry 26 is configured to decide to use uplink beamforming for transmitting the reference signal, in dependence on at least one of: a location of the wireless device 12 with respect to the network node 10, channel conditions observed at the wireless device 12 with respect to the network node 10, configuration information stored at the wireless device 12, and control signaling received from the wireless communication network. In one example of location dependency, the wireless device 12 uses uplink beamforming for its reference signal transmissions when operating in cell edge areas. In one example of channel conditions dependency, the wireless device 12 uses uplink beamforming for its reference signal transmissions when downlink signals from the network node 10 are received below a threshold signal strength or quality. In one example of network signaling dependency, the network node 10 sends an Information Element, IE, flag, or other indicator, implicit or explicit, that enables or disables reference-signal beamforming at the wireless device 12.

Similarly, in some embodiments, the processing circuitry 26 in one or more embodiments is configured to select the precoder matrix to use for uplink beamforming of the reference signal according to control signaling received from the wireless communication network. Additionally, or alternatively, the wireless device 12 selects the precoder based on channel estimate information determined by the wireless device 12 with respect to the network node 10. In at least one such embodiment, the wireless device 12 autonomously selects the precoder and uses it, unless or until the network signals an overriding precoder selection.

In at least some embodiments, the processing circuitry 26 is configured to maintain linking information in the wireless device 12 that logically links the received downlink transmission to the reference signal and indicates whether or not uplink beamforming was used for transmission of the reference signal. In such embodiments, the processing circuitry 26 is further configured to account for the effective channel by applying the linear transform to the received downlink transmission in dependence on determining that the linking information indicates that uplink beamforming was used for transmission of the reference signal. In an example case, a predefined relationship exists between uplink reference signal transmissions by the wireless device 12 and corresponding downlink transmissions by the network node 10 towards the wireless device 12. For example, a scheduled downlink transmission corresponds to a particular uplink reference signal transmission if it occurs a defined number of transmission time intervals—e.g., a defined number of radio signal subframes—after transmission of the uplink reference signal.

For any given downlink transmission received at the wireless device 12, the processing circuitry 26 in one or more embodiments is configured to determine whether the given downlink transmission corresponds to a prior transmission of a beamformed reference signal by the wireless device 12. If so, the processing circuitry 26 obtains a corresponding compensated received downlink transmission from the given received downlink transmission for demodulation, according to the precoder matrix used for the beamformed uplink reference signal.

In another embodiment, a non-transitory computer-readable medium stores a computer program. The program comprises program instructions for execution by a processor of a wireless device 12, e.g., the processing circuitry 26. The wireless device 12 receives a downlink transmission that is beamformed by a network node 10 in a network according to a channel estimate determined from a reference signal transmitted by the wireless device 12. Correspondingly, the program instructions configure the wireless device 12 to obtain a compensated received transmission by linearly transforming the received downlink transmission according to a precoder matrix used by the wireless device 12 for beamforming the reference signal. Demodulation processing performed by the wireless device 12 in such embodiments may depend on further computer program instructions that configure the wireless device 12 to demodulate the compensated received transmission, for recovering information conveyed in the downlink transmission.

Whether or not it is implemented according to the example circuitry of FIG. 1, a wireless device 12 as contemplated herein is configured for operation in a wireless communication network and is adapted to transmit a reference signal to the wireless communication network using uplink beamforming. Further, the wireless device 12 is adapted to receive a downlink transmission from the wireless communication network that was beamformed in dependence on an effective channel arising from the use of uplink beamforming on the reference signal. Still further, the wireless device 12 is adapted to account for the effective channel by applying a linear transform to the received downlink transmission, to thereby obtain a compensated received transmission. Here, the linear transform is based on a precoder matrix used for the uplink beamforming and the compensated received transmission may be used, e.g., for demodulation and information recovery at the wireless device 12.

Figure 2:
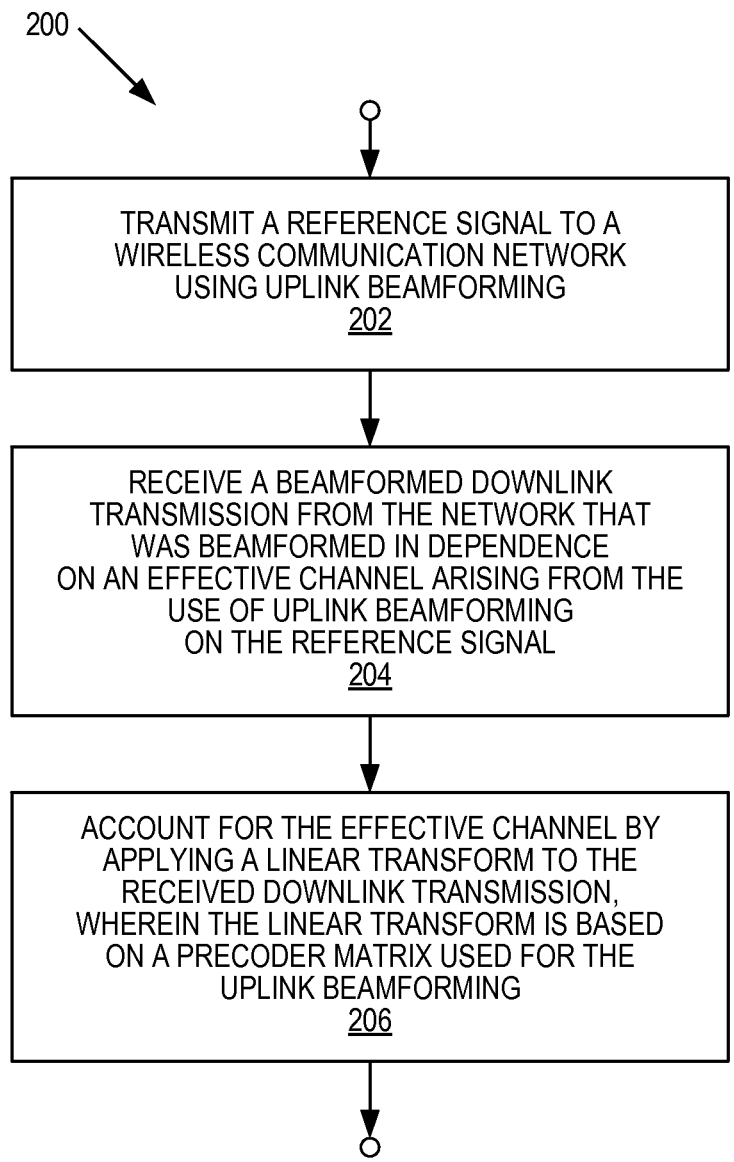
FIG. 2 is a logic flow diagram of one embodiment of a method of processing at a wireless device.

FIG. 2 illustrates a method 200 performed by a wireless device 12, such as the wireless device 12 illustrated in FIG. 1. The method 200 includes transmitting (Block 202) a reference signal to a wireless communication network using uplink beamforming, receiving (Block 204) a downlink transmission from network that was beamformed in dependence on an effective channel arising from the use of uplink beamforming on the reference signal, and accounting (Block 206) for the effective channel by applying a linear transform to the received downlink transmission to obtain a compensated received transmission, wherein the linear transform is based on a precoder matrix used by the wireless device 12 for the uplink beamforming. In the same or another embodiment, the method 200 includes demodulating the compensated received transmission, to recover the information conveyed in the downlink transmission.

Figure 3:
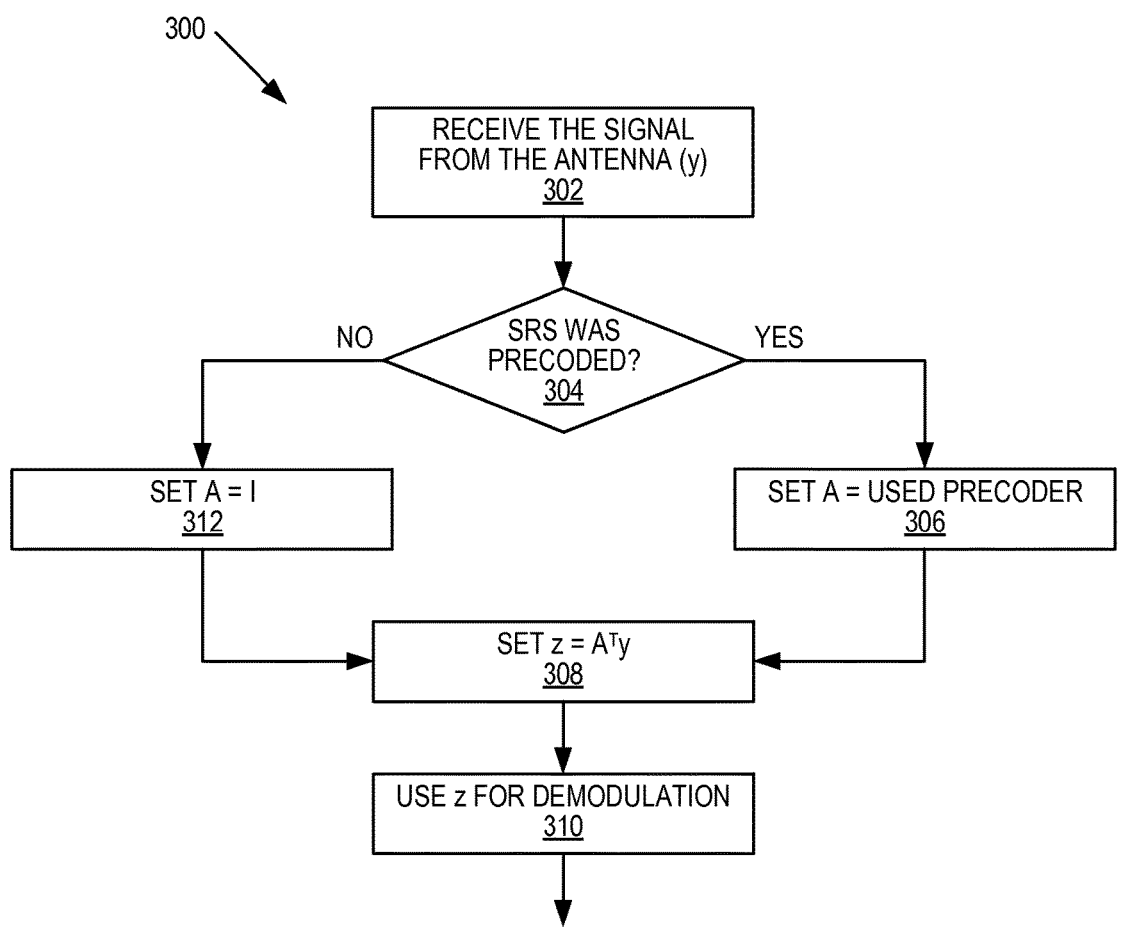
FIG. 3 is a logic flow diagram of another embodiment of a method of processing at a wireless device.

FIG. 3 illustrates another method 300, which may be regarded as one example of a more detailed implementation of the method 200. Here, the wireless device 12 receives (Block 302) the downlink transmission on two or more of the receive antennas 14 of the wireless device 12—denoted here as "antennas y". Further, the reference signal transmitted on the uplink by the wireless device 12 is a Sounding Reference Signal or SRS, and the wireless device 12 device receives a downlink transmission from the network node 10 that is channel-adapted by the network node 10, in dependence on the SRS transmission by the wireless device 12.

The method 300 includes determining (Block 304) whether the SRS was precoded—i.e., whether the wireless device 12 transmitted the SRS with or without uplink beamforming. The determination involves, for example, the wireless device 12 maintaining linking information that logically links the SRS to the received downlink transmission—e.g., based on knowing that the downlink transmission was received at a defined number of subframes after transmission of the SRS.

If the SRS was precoded (YES from Block 304), processing continues with the wireless device 12 setting a linear transform matrix equal to the precoder—an antenna-weighting matrix—used for precoding the SRS (Block 306). From there, processing continues with compensating the received downlink transmission with the transpose of the precoder matrix. Such processing is seen in Block 308 as, $$z = A^T y,$$

where y is a matrix of received signal samples received on two or more of the antennas 14, A is the precoder matrix of antenna weights used for beamforming the SRS from two or more of the antennas 14, $A^T$ is the transpose the precoder matrix, and z is the resulting matrix of compensated signal samples. Processing further continues with demodulating (Block 310) the compensated received transmission z.

If the SRS was not precoded (NO from Block 304), processing continues with the wireless device 12 setting the linear transform matrix A equal to the identity matrix I (Block 312), and then applying $A^T$ to the received signal y (Block 308). Application of the identity matrix transpose $I^T$ does not change the received signal y, and is equivalent to skipping compensation and using the downlink transmission y directly in the demodulation processing seen in Block 312. One advantage of using the identity matrix in cases where the SRS was not precoded is simplification of the program code used to carry out the overall processing—i.e., the wireless device 12 always applies $A^T$ to the received signal y, and simply decides whether $A^T$ is the identity matrix or the transpose of an actual precoder matrix in dependence on whether or not the SRS was precoded. Equivalently, in one or more embodiments, the wireless device 12 advances on along the "NO" processing path from Block 304 directly to demodulation of the received downlink transmission y, without calculating $A^T$ as $I^T$ and without forming z as $I^T y$.

Figure 4:
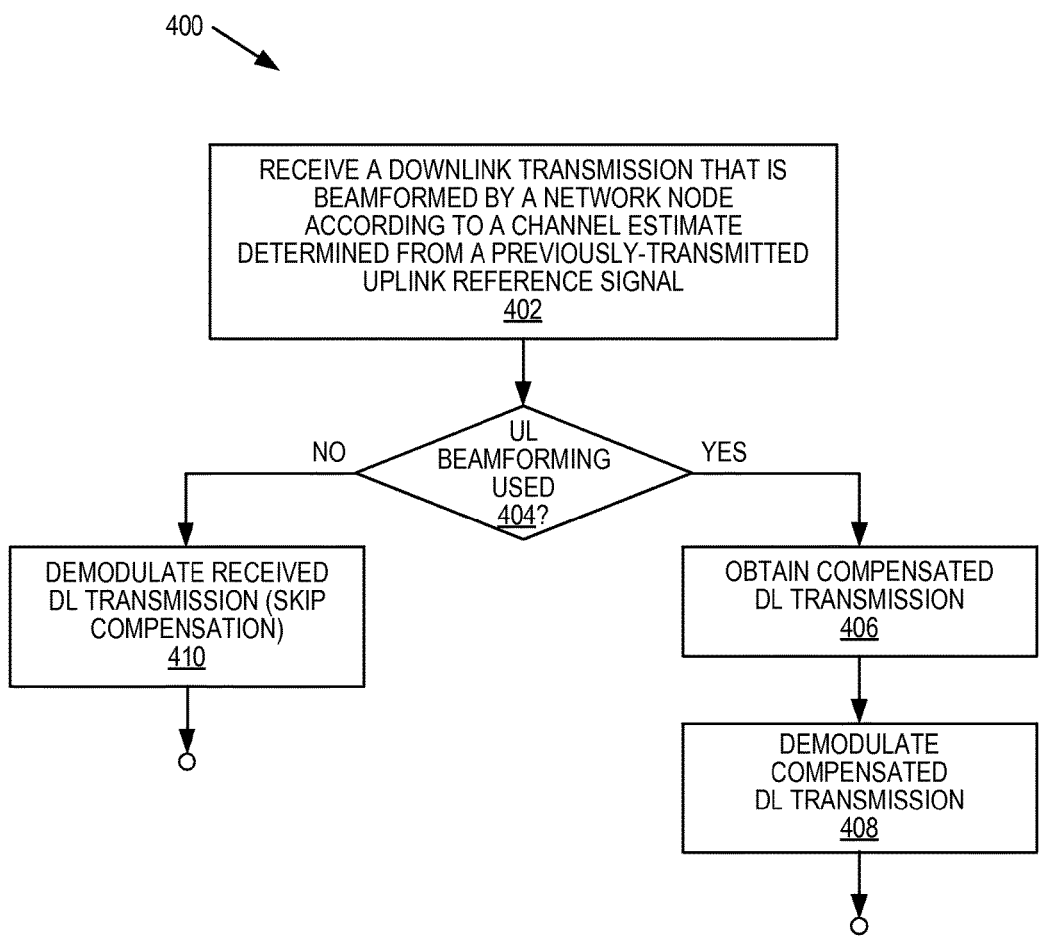
FIG. 4 is a logic flow diagram of yet another embodiment of a method of processing at a wireless device.

Such an approach is encompassed in the method 400 illustrated in FIG. 4. The method 400 can also be understood as a more detailed example of the method 200. The method 400 includes receiving a downlink transmission (Block 402) that is beamformed by a network node 10 according to a channel estimate determined from an uplink reference signal previously transmitted by the wireless device 12. At Block 404, the wireless device 12 determines whether the uplink reference signal in question was beamformed. If so, the wireless device 12 obtains a compensated downlink transmission (Block 406) and demodulates the compensated downlink transmission (Block 408) to obtain the information conveyed in the downlink transmission. If not, the wireless device 12 demodulates the received downlink transmission (Block 410), i.e., it skips the compensation processing.

Figure 5:
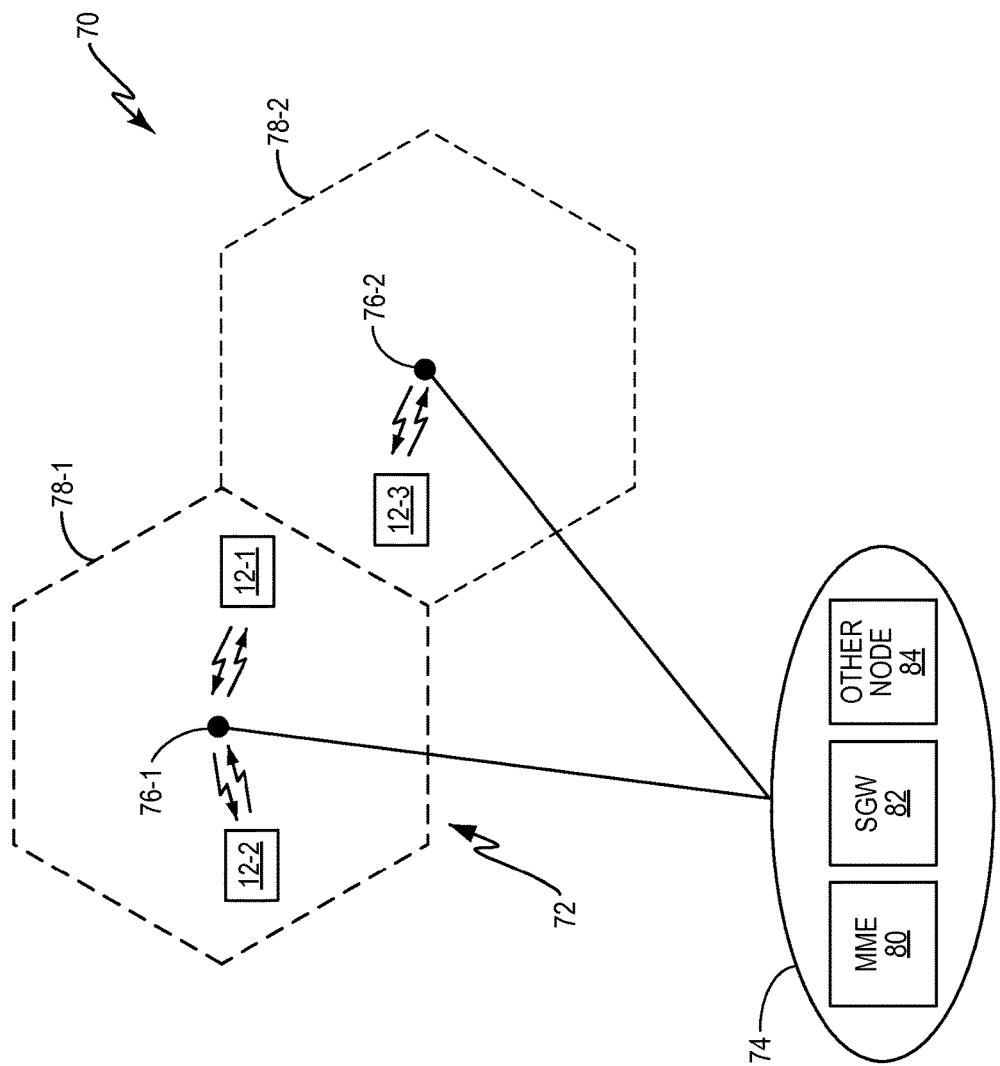
FIG. 5 is block diagram of one embodiment of a wireless communication network.

FIG. 5 illustrates an example of the wireless communication network referenced above, identified in the diagram as a wireless communication network 70. As a non-limiting example, the network 70 comprises a cellular communication network based on the LTE specifications promulgated by the 3GPP.

The network 70 includes a Radio Access Network, RAN, 72 and a Core Network, CN, 74. The RAN 72 includes one or more radio base stations 76, e.g., 76-1 and 76-2, with each radio base station 76 providing service in one or more cells 78. Here, the radio base station 76-1 provides cellular communication services in a cell 78-1 and the radio base station 76-2 provides cellular communication services in an adjacent cell 78-2. One or more wireless devices 12 operate within the wireless communication network 70, e.g., 12-1, 12-2, etc. The CN 74 includes a number of nodes supporting the communication services, including a Mobility Management Entity, MME, 80, a Serving Gateway, SGW, 82, and one or more other nodes 84. The CN 74 may, of course, include any number of nodes not illustrated or discussed here, and it will be appreciated that the CN 74 is not germane to the focus of this disclosure.

One or more of the radio base stations 76 is configured to operate as the aforementioned network node 10. A given one of the wireless devices 12 receives a downlink transmission from a radio base station 76 is beamformed in dependence on an effective channel arising from the use of uplink beamforming on a reference signal transmitted by the wireless device 12. Further, the wireless device 12 accounts for the effective channel by applying a linear transform to the received downlink transmission to obtain a compensated received transmission. The linear transform is based on a precoder matrix used for the uplink beamforming.

In at least one example of such operation, the wireless device 12 beamforms the uplink reference signal using a precoder that maximizes the average path gain to a serving base station 76. For example, the wireless device 12 receives Cell-specific Reference Signals, CRS, on the downlink from the base station 76 and uses the CRS to estimate the downlink channel between it and the base station 76. In turn, the wireless device 12 selects a particular precoder—e.g., from a defined codebook, or based on calculations—based on the channel estimate. For base stations having potentially many antenna elements, the wireless device 12 may be configured to beamform towards the "average" channel, or the wireless device 12 may be configured to try multiple precoders and receive feedback from the base station 76 as to which one it should use. For example, the base station 76 determines which precoder yields the highest signal strength or best Signal-to-Interference-plus-Noise-Ratio, SINR.

The base station 76, operating as an example network node 10, also may control whether or not the wireless device 12 uses uplink beamforming for one or more reference signal transmissions. For example, an example network node 10 monitors channel conditions, e.g., based on tracking received signal strength and/or quality, with respect to a particular wireless device 12 and indicates to the wireless device 12 as to whether or not it should beamform its uplink SRS transmissions. Not beamforming has the advantage of saving processing power at the wireless device 12, hence, beamforming may be activated only in relatively poor conditions or when the wireless device 12 is known to be at the cell edge.

To better appreciate an example implementation of the network node 10 in such embodiments, refer back to FIG. 1. There, the network node 10 includes one or more communication interfaces 50 that include one or more radiofrequency receivers 52 and transmitters 54 and associated protocol processing circuitry that are adapted to support the uplink and downlink air interfaces implemented within the wireless communication network 70 in which the network node 10 operates. Processing circuitry 56 is operatively associated with the communication interface(s) 50 and comprises fixed circuitry, programmed circuitry, or a combination of fixed and programmed circuitry.

In an example embodiment, the processing circuitry 56 is at least partly implemented using programmed circuitry and comprises, for example, one or more processor circuits, such as one or more microprocessors, Digital Signal Processors or DSPs, Application Specific Integrated Circuits or ASICs, Field Programmable Gate Arrays or FPGAs, or other digital processing circuitry. Correspondingly, the processing circuitry 56 includes or is associated with one or more types of computer-readable media—"STORAGE 58" in the figure—such as one or more types of memory circuits such as FLASH, EEPROM, SRAM, DRAM, etc. Additionally, or alternatively, the storage 58 comprises hard disk storage, Solid State Disk, SSD, storage, etc.

In general, the storage 58 provides both working memory and longer-term storage. In at least one embodiment, the storage 58 provides non-transitory storage for a computer program 60 and one or more items of configuration data 62. Here, non-transitory does not necessarily mean permanent or unchanging storage but does mean storage of at least some persistence—i.e., holding information for subsequent retrieval. The computer program 60, which may comprise a number of related or supporting programs, comprises program instructions that, when executed by the processing circuitry 56, configure the network node 10 to operate according to the examples described herein. For example, the network node 10 is configured to selectively control whether individual wireless devices 12 or groups of wireless devices 12 use uplink beamforming for SRS transmissions.

Consider the case where there are M antennas 16 available at a network node 10 for making downlink transmissions towards a wireless device 12. Representing the number of antennas 14 available at the wireless device 12 for receiving these downlink transmissions by n, the downlink channel between the network node 10 and the wireless device 12 can be represented as a M×n complex matrix H, where each matrix element $H_{i,j}$ denotes the downlink channel gain between the i-th transmit antenna 14 and the j-th receive antenna 16.

Assuming reciprocity between the uplink and downlink channels, the uplink channel G equals $H^T$. Pilot symbols, $s_{device}$ transmitted by a wireless device 12 on the uplink as reference signals are then received at a network node 10 as $$y_{node} = H^T s_{device} + e_{node},$$

where $y_{node}$ denotes the received signal vector at the network node 10, $s_{device}$ denotes the vector of pilot symbols transmitted across the involved antennas 16 at the wireless device 12, and $e_{node}$ denotes additive noise at the network node 10. If the uplink reference signal $s_{device}$ is beamformed by the wireless device 12 using a precoder $W_{device}$ of antenna weights, then $$y_{node} = H^T W_{device} s_{device} + e_{node}.$$

The network node 10 estimates the downlink channel H based on $y_{node}$, and uses that estimate to compute or select a downlink precoder $W_{node}$ that comprises the antenna weights used for beamforming a downlink transmission $s_{node}$ from the network node 10 to the wireless device 12. Here, the downlink data transmission $s_{node}$ comprises, e.g., a scheduled data transmission being adapted based on the channel estimated derived from $y_{node}$. The beamformed signal is denoted as $x_{node}$ and is received at the wireless device 12 as $$y_{device} = \tilde{H} x_{node} + e_{device}.$$

Here, $\tilde{H}$ denotes the "effective" downlink channel arising from the network node 10 basing its estimation of the downlink channel on receiving a beamformed reference signal from the wireless device 12. In other words, $\tilde{H} = W_{device}^T H$.

Advantageously, the wireless device 12 backs out or otherwise compensates for the influence of $W_{device}^T$ on the received signal samples comprising $y_{device}$ by applying the linear transformation taught herein. Consequently, the teachings herein provide for enhanced CSI acquisition at the network node 10, i.e., via beamforming of the uplink reference signal, and compensation of a corresponding downlink transmission transmitted over the effective downlink channel arising as a consequence of the uplink beamforming. The wireless device 12 may store or otherwise remember the precoder that it used for uplink beamforming a particular reference signal transmission, and may link that precoder to correspondingly receive downlink transmission, such that that precoder is used to linearly transform the received downlink transmission to remove the influence of the effective channel.

While such processing may be particularly advantageous in FD-MIMO systems, it should be appreciated that the teachings herein are applicable in any system that uses uplink reference signal transmissions for downlink channel estimation and corresponding adaptation of downlink data transmissions. Further, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method at a wireless device configured for operation in a wireless communication network comprising:
   transmitting a reference signal to the wireless communication network using uplink beamforming;
   receiving a downlink transmission from the wireless communication network that was beamformed in dependence on an effective channel arising from the use of uplink beamforming on the reference signal; and
   accounting for the effective channel by applying a linear transform to the received downlink transmission to obtain a compensated received transmission, wherein the linear transform is based on a precoder matrix used for the uplink beamforming.

2. The method of claim 1, further comprising demodulating the compensated received transmission, for recovering information conveyed in the downlink transmission.

3. The method of claim 1, wherein linearly transforming the received downlink transmission comprises applying a transpose of the precoder matrix to the received downlink transmission.

4. The method of claim 1, further comprising deciding to use uplink beamforming for transmitting the reference signal in dependence on at least one of:
   a location of the wireless device with respect to the network node;
   channel conditions observed at the wireless device with respect to the network node;
   configuration information stored at the wireless device; and
   control signaling received from the wireless communication network.

5. The method of claim 1, further comprising selecting the precoder matrix according to at least one of: control signaling received from the wireless communication network, and channel estimate information determined by the wireless device with respect to the network node.

6. The method of claim 1, further comprising maintaining linking information in the wireless device that logically links the received downlink transmission to the reference signal and indicates whether or not uplink beamforming was used for transmission of the reference signal, and wherein accounting for the effective channel by applying the linear transform to the received downlink transmission is conditioned on the linking information indicating that uplink beamforming was used for transmission of the reference signal.

7. The method of claim 1, further comprising, for any given downlink transmission received at the wireless device, determining whether the given downlink transmission corresponds to a prior transmission of a beamformed reference signal by the wireless device and, if so, obtaining a corresponding compensated received transmission from the given received downlink transmission for demodulation, according to the precoder matrix used for the beamformed reference signal.

8. A wireless device configured for operation in a wireless communication network and adapted to:
   transmit a reference signal to the wireless communication network using uplink beamforming;
   receive a downlink transmission from the wireless communication network that was beamformed in dependence on an effective channel arising from the use of uplink beamforming on the reference signal; and
   account for the effective channel by applying a linear transform to the received downlink transmission to obtain a compensated received transmission, wherein the linear transform is based on a precoder matrix used for the uplink beamforming.

9. The wireless device of claim 8, wherein the wireless device is further adapted to demodulate the compensated received downlink transmission, for recovering information conveyed in the received downlink transmission.

10. The wireless device of claim 8, wherein the wireless device is adapted to linearly transform the received downlink transmission by applying a transpose of the precoder matrix to the received downlink transmission.

11. The wireless device of claim 8, wherein the wireless device is further adapted to decide to use uplink beamforming for transmitting the reference signal, in dependence on at least one of:
   a location of the wireless device with respect to the network node;
   channel conditions observed at the wireless device with respect to the network node;
   configuration information stored at the wireless device; and
   control signaling received from the wireless communication network.

12. The wireless device of claim 8, wherein the wireless device is further adapted to select the precoder matrix according to at least one of: control signaling received from the wireless communication network, and channel estimate information determined by the wireless device with respect to the network node.

13. The wireless device of claim 8, wherein the wireless device is further adapted to maintain linking information in the wireless device that logically links the received downlink transmission to the reference signal and indicates whether or not uplink beamforming was used for transmission of the reference signal, and wherein the wireless device is further adapted to account for the effective channel by applying the linear transform to the received downlink transmission in dependence on determining that the linking information indicates that uplink beamforming was used for transmission of the reference signal.

14. The wireless device of claim 8, wherein, for any given downlink transmission received at the wireless device, wherein the wireless device is adapted to determine whether the given downlink transmission corresponds to a prior transmission of a beamformed reference signal by the wireless device and, if so, obtain a corresponding compensated received downlink transmission from the given received downlink transmission for demodulation, according to the precoder matrix used for the beamformed uplink reference signal.

15. A non-transitory computer-readable medium storing a computer program comprising program instructions that, when executed by a processor of a wireless device that receives a downlink transmission that is beamformed by a network node in a wireless communication network according to a channel estimate determined from a reference signal transmitted by the wireless device, configures the wireless device to obtain a compensated received transmission by linearly transforming the received downlink transmission according to a precoder matrix used by the wireless device for beamforming the reference signal.

16. The non-transitory computer-readable medium of claim 15, wherein the computer program further comprises program instructions configuring the wireless device to demodulate the compensated received transmission, for recovering information conveyed in the downlink transmission.

17. A wireless device configured for operation in a wireless communication network and comprising:
   a communication module configured to receive a downlink transmission that is beamformed by a network node in a wireless communication network according to a channel estimate determined from a reference signal transmitted by the wireless device; and
   a compensation module configured to obtain a compensated received transmission by linearly transforming the received downlink transmission according to a precoder matrix used by the wireless device for beamforming the reference signal.

18. The wireless device of claim 17, further comprising a demodulation module configured to demodulate the compensated received transmission, for recovering information conveyed in the downlink transmission.

\* \* \* \* \*